US012728701B2

(12) United States Patent
Seo

(10) Patent No.: US 12,728,701 B2
(45) Date of Patent: Sep. 8, 2026

(54) HEATING SYSTEM OF ELECTRIC VEHICLE

(71) Applicants: Hyundai Motor Company, Seoul (KR); Kia Corporation, Seoul (KR)

(72) Inventor: Jungmin Seo, Suwon-si (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 932 days.

(21) Appl. No.: 17/831,225

(22) Filed: Jun. 2, 2022

(65) Prior Publication Data

US 2022/0402333 A1 Dec. 22, 2022

(30) Foreign Application Priority Data

Jun. 16, 2021 (KR) ........................ 10-2021-0078081

(51) Int. Cl.
*B60H 1/03* (2006.01)
*B60H 1/00* (2006.01)

(52) U.S. Cl.
CPC ......... *B60H 1/034* (2013.01); *B60H 1/00392* (2013.01); *B60H 1/00885* (2013.01); *B60H 2001/00307* (2013.01)

(58) Field of Classification Search
USPC ..................................................... 237/12.3 B
See application file for complete search history.

(56) References Cited

U.S. PATENT DOCUMENTS 7,789,176 B2 * 9/2010 Zhou .................. B60H 1/00885 180/65.1
10,427,491 B2 * 10/2019 Johnston ................ B60H 1/323
11,207,946 B2 12/2021 Lee et al.
11,634,008 B2 4/2023 Lee et al.
11,634,009 B2 4/2023 Lee et al.
2011/0296855 A1 * 12/2011 Johnston ................ B60L 50/40 62/160
2015/0034272 A1 * 2/2015 Saab .................... B60H 1/2215 123/41.31

(Continued)

FOREIGN PATENT DOCUMENTS

CN 110356188 A 10/2019
CN 111251880 A 6/2020

(Continued)

*Primary Examiner* — Helena Kosanovic
*Assistant Examiner* — John E Bargero
(74) *Attorney, Agent, or Firm* — MORGAN, LEWIS & BOCKIUS LLP

(57) ABSTRACT

A heating system of a vehicle includes: a cooling line in which a radiator mounted with a cooling fan is provided; a heating line including a cooling water heater heating cooling water and an internal heater provided therein, and fluidly connected to the cooling line; a first branch line fluidly connecting a first portion of the cooling line and a first portion of the heating line, and including a first electrically powered water pump and an electric part; a second branch line fluidly connecting a second portion of the cooling line and a second portion of the heating line, and including a second electrically powered water pump; a first valve provided in the cooling line, the heating line, and a branch point of the first branch line; and a second valve provided in the cooling line, the heating line, and the branch point of the second branch line.

17 Claims, 5 Drawing Sheets

(56) References Cited

U.S. PATENT DOCUMENTS

| | | | | |
|---|---|---|---|---|
| 2018/0178615 | A1* | 6/2018 | Xia | H01M 10/486 |
| 2020/0171913 | A1 | 6/2020 | Kim et al. | |
| 2020/0398641 | A1 | 12/2020 | Kim et al. | |
| 2024/0097240 | A1* | 3/2024 | Ernst | H05K 7/20272 |

FOREIGN PATENT DOCUMENTS

| | | | |
|---|---|---|---|
| KR | 10-2014-0106788 | A | 9/2014 |
| KR | 10-2021-0000117 | A | 1/2021 |

* cited by examiner

HEATING SYSTEM OF ELECTRIC VEHICLE

CROSS-REFERENCE TO RELATED APPLICATION

The present application claims priority to Korean Patent Application No. 10-2021-0078081 filed on Jun. 16, 2021, the entire contents of which is incorporated herein for all purposes by this reference.

BACKGROUND OF THE PRESENT DISCLOSURE

Field of the Present Disclosure

The present disclosure relates to a heating system of an electric vehicle, and more particularly, to a heating system of an electric vehicle, which can use waste heat generated from electric parts for heating a vehicle.

DESCRIPTION OF RELATED ART

In general, an air-conditioning system of a vehicle allows a passenger to have a pleasant environment even under an arbitrary climate and an arbitrary driving condition. A heating mode of the heating system of the air-conditioning system primarily used in a winter season warns indoor air of the vehicle and prevents a window of the vehicle from being blurred or the window from being steamy due to moisture to allow a driver to perform pleasant and safe driving.

Such a heating mode of the heating system which utilizes a hot-water type heater using heat generated from an engine while driving is a scheme that makes outdoor air introduced through an air intake duct to pass through the hot-water type heater and increases a temperature of the outdoor air, and blows the air into a vehicle interior through a defroster and an internal emission duct by use of a blower.

Meanwhile, in recent years, as interest in energy efficiency and environmental pollution problem has been increasing, there has been a demand for the development of environmentally friendly vehicles capable of substantially replacing internal combustion engine vehicles. The environmentally friendly vehicles are usually categorized into electric vehicles driven by use of fuel cells or electricity as a power source or a hybrid vehicle driven by an engine and an electric battery.

Among the environmentally friendly vehicles, because heating is made through a heat exchange between high-temperature cooling water and internal heating air in a separate internal heater drive instead of the engine in the air-conditioning system applied to the electric vehicle, additional energy loss is generated by power consumed in the heater.

On the other hand, in the case of a conventional internal combustion engine vehicle, when an external temperature is low like the winter, an interior of the vehicle is heated by use of waste heat generated from the engine, and as a result, additional energy loss is not generated.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a heating system of an electric vehicle, which can increase energy efficiency upon internal heating to the electric vehicle.

Various aspects of the present disclosure are directed to providing a heating system of a vehicle, which includes a cooling line in which a radiator mounted with a cooling fan is provided; a heating line including a cooling water heater heating cooling water and an internal heater for internal heating provided therein, and fluidly connected to the cooling line; a first branch line fluidly connecting a first portion of the cooling line and a first portion of the heating line, and including a first electrically powered water pump and an electric part provided therein; a second branch line fluidly connecting a second portion of the cooling line and a second portion of the heating line, and including a second electrically powered water pump provided therein; a first valve provided in the cooling line, the heating line, and a branch point of the first branch line, in which the first portion of the heating line and the cooling line are connected; and a second valve provided in the cooling line, the heating line, and a branch point of the second branch line in which the second portion of the cooling line and the heating line are connected, in which a heating mode of the heating system may operate, by operations of the first valve and the second valve, in a first mode in which the heating line and the second branch line form a closed circuit and the cooling line and the first branch line form the closed circuit, or in a second mode in which the heating line and the first branch line form the closed circuit.

The first mode or the second mode may be switched based on a temperature of the cooling water which flows on the first branch line downstream of the electric part, a temperature of the cooling water which flows on the first branch line upstream of the first electrically powered water pump, and a temperature of the cooling water which flows on the heating line downstream of the internal heater, an ON/OFF state of a heating switch, and an operation state of the cooling water heater.

When the heating switch is turned off or the temperature of the cooling water which flows on the first branch line downstream of the electric part is a predetermined temperature or lower than the predetermined temperature, the heating mode may operate in the first mode.

In the first mode, the first electrically powered water pump, the second electrically powered water pump, and the cooling fan may operate.

In the first mode, the first electrically powered water pump, the second electrically powered water pump, and the cooling fan may operate.

In the first mode, the first electrically powered water pump and the second electrically powered water pump may operate, and the cooling fan may stop.

When the heating switch is turned on, the temperature of the cooling water which flows on the first branch line downstream of the electric part is the predetermined temperature or higher than the predetermined temperature, the cooling water heater is in an OFF state, and the temperature of the cooling water which flows on the first branch line downstream of the electric part is higher than the temperature of the cooling water which flows on the heating line downstream of the internal heater, the heating mode may operate as the second mode.

In the second mode, the first electrically powered water pump, the second electrically powered water pump, and the cooling fan may operate.

The cooling water heater may operate within a set temperature range.

When the temperature of the cooling water which flows on the first branch line upstream of the first electrically powered water pump is a threshold temperature or higher than the threshold temperature, the heating mode may operate as the first mode.

In the first mode, the first electrically powered water pump, the second electrically powered water pump, and the cooling fan may operate.

The first valve and the second valve may be three-way valves.

According to various exemplary embodiments of the present disclosure, in a heating system of a vehicle, a heating line and a cooling line are selectively separated as necessary to use waste heat generated from electric parts for heating of a vehicle, reducing power consumption.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

These drawings are for describing various exemplary embodiments of the present disclosure, and therefore the technical spirit of the present disclosure may not be construed as being limited to the accompanying drawings.

Figure 1:
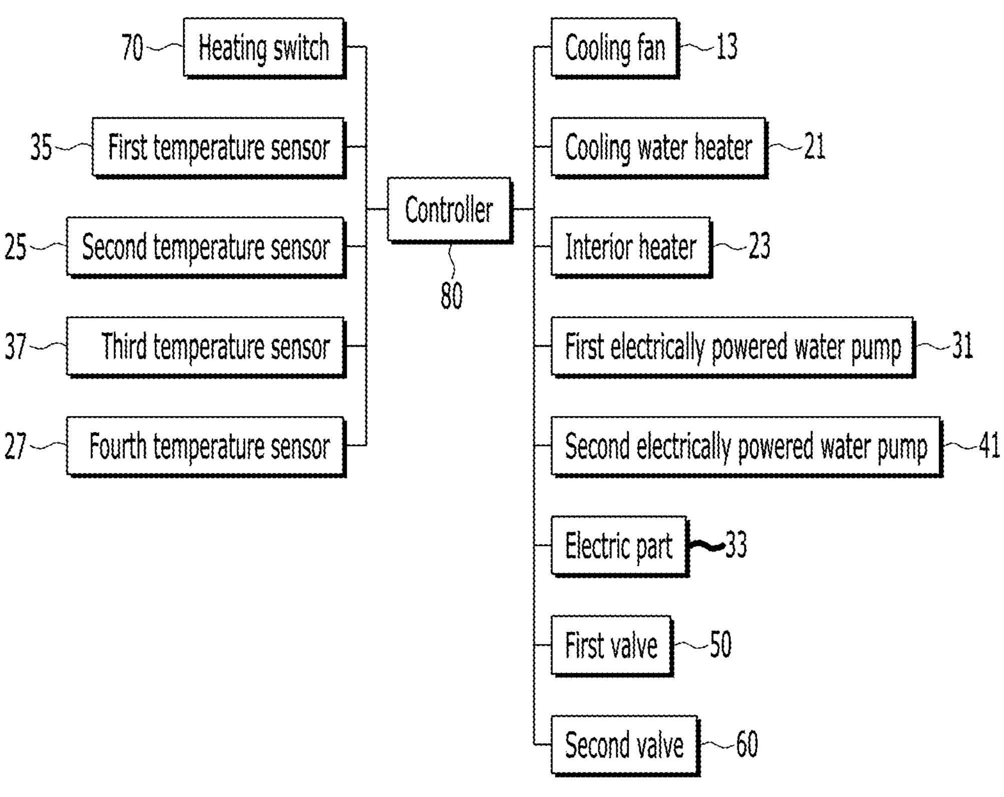
FIG. 1 is a block diagram illustrating a configuration of a heating system of an electric vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

The drawings and description are to be regarded as illustrative in nature and not restrictive, and like reference numerals designate like elements throughout the specification.

Furthermore, since size and thickness of each component illustrated in the drawings are arbitrarily represented for convenience in explanation, the present disclosure is not limited to the illustrated size and thickness of each component and the thickness is enlarged and illustrated to clearly express various parts and areas.

Hereinafter, a heating system of an electric vehicle according to various exemplary embodiments of the present disclosure will be described in detail.

Figure 2:
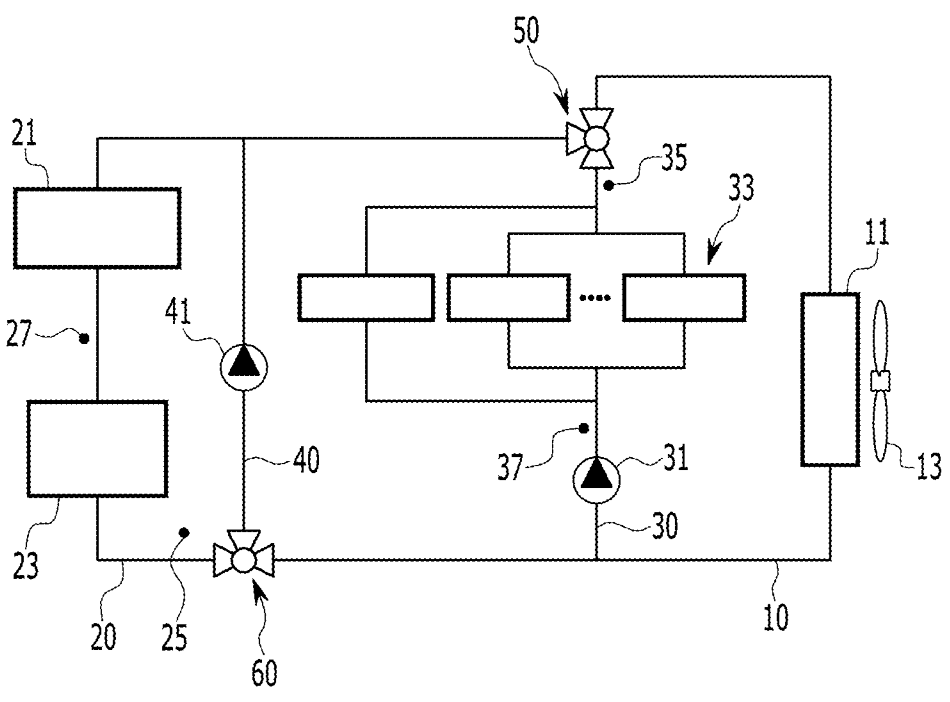
FIG. 2 is a diagram illustrating a configuration of a heating system of an electric vehicle according to various exemplary embodiments of the present disclosure.

FIG. 1 is a block diagram illustrating a configuration of a heating system of an electric vehicle according to various exemplary embodiments of the present disclosure. FIG. 2 is a diagram illustrating a configuration of a heating system of an electric vehicle according to various exemplary embodiments of the present disclosure.

As illustrated in FIG. 1 and FIG. 2, the heating system of an electric vehicle according to various exemplary embodiments of the present disclosure may include a cooling line 10 in which a radiator mounted with a cooling fan 13 is provided, a heating line 20 including a cooling water heater 21 heating cooling water and an internal heater 23 for internal heating provided therein, and fluidly connected to the cooling line 10, a first branch line 30 connecting the cooling line 10 and the heating line 20 and including a first electrically powered water pump 31 and electric parts 33 provided therein, and a second branch line 40 connecting the cooling line 10 and the heating line 20 and including a second electrically powered water pump 41 provided therein.

The cooling line 10, the heating line 20, the first branch line 30, and the second branch line 40 may be selectively fluidly connected so that the cooling water is circulated.

The cooling water heater 21 and the internal heater 23 provided in the heating line 20 may be sequentially provided according to a flow direction of the cooling water. Furthermore, the second electrically powered water pump 41 and the electric parts 33 provided in the first branch line 30 may be sequentially provided according to the flow direction of the cooling water.

The heating system of the vehicle according to various exemplary embodiments of the present disclosure may operate in a first mode in which the heating line 20 and the second branch line 40 form a closed circuit and the cooling line 10 and the first branch line 30 form the closed circuit and a second mode in which the heating line 20 and the first branch line 30 form the closed circuit and the cooling line 10 and the second branch line 40 form an open circuit.

To the present end, a first valve 50 may be provided at a point where the cooling line 10, the heating line 20, and the first branch line 30 meet and a second valve 60 may be provided at a point where the cooling line 10, the heating line 20, and the second branch line 40 meet. The first valve 50 and the second valve 60 may be implemented through three-way valves.

The heating system of a vehicle according to various exemplary embodiments of the present disclosure may include a first temperature sensor 35 sensing a temperature of the cooling water after cooling the electric part 33, a second temperature sensor 25 sensing the temperature of the cooling water after heating the interior of the vehicle, and a third temperature sensor 37 sensing the temperature of the cooling water before cooling the electric part 33.

In the instant case, the first temperature sensor 35 may be provided on the first branch line 30 downstream of the electric part 33, the second temperature sensor 25 may be provided on the heating line 20 downstream of the internal heater 23, and the third temperature sensor 37 may be provided on the first branch line 30 upstream of the first electrically powered water pump 31.

The temperatures of the cooling water detected by the first temperature sensor 35 to the third temperature sensor 37 are transmitted to a controller 80.

Furthermore, the heating system of a vehicle according to various exemplary embodiments of the present disclosure may include a heating switch 70 receiving an operation command of the internal heater 23 by a driver. An ON/OFF state of the heating switch 70 is transmitted to the controller 80.

The controller 80 controls the operations of the first valve 50 and the second valve 60, the operation of the cooling fan 13, the operation of the cooling water heater 21, the operation of the first electrically powered water pump 31, and the operation of the second electrically powered water pump 41 based on the temperatures of the cooling water detected by the first temperature sensor 35 to the third temperature sensor 37 (in other words, the temperature of the cooling water which flows on the first branch line 30 downstream of the electric part 33, the temperature of the cooling water which flows on the first branch line 30 upstream of the first electrically powered water pump 31, and the temperature of the cooling water which flows on the heating line 20 downstream of the internal heater 23), the operation state of the cooling water heater 21, and the ON/OFF state of the heating switch 70.

That is, the heating mode including the first mode and the second mode may be switched based on the temperature of the cooling water which flows on the first branch line 30 downstream of the electric part 33, the temperature of the cooling water which flows on the first branch line 30 upstream of the first electrically powered water pump 31, and the temperature of the cooling water which flows on the heating line 20 downstream of the internal heater 23, the ON/OFF state of the heating switch 70, and the operation state of the cooling water heater 21.

To the present end, the controller 80 may be provided as one or more processors which operate by a set program and the set program may be configured to perform each step of a heating method of the vehicle according to the exemplary embodiment of the present disclosure.

Hereinafter, the operation of the heating system of the vehicle according to the exemplary embodiment of the present disclosure will be described in detail with reference to the accompanying drawings.

Figure 3:
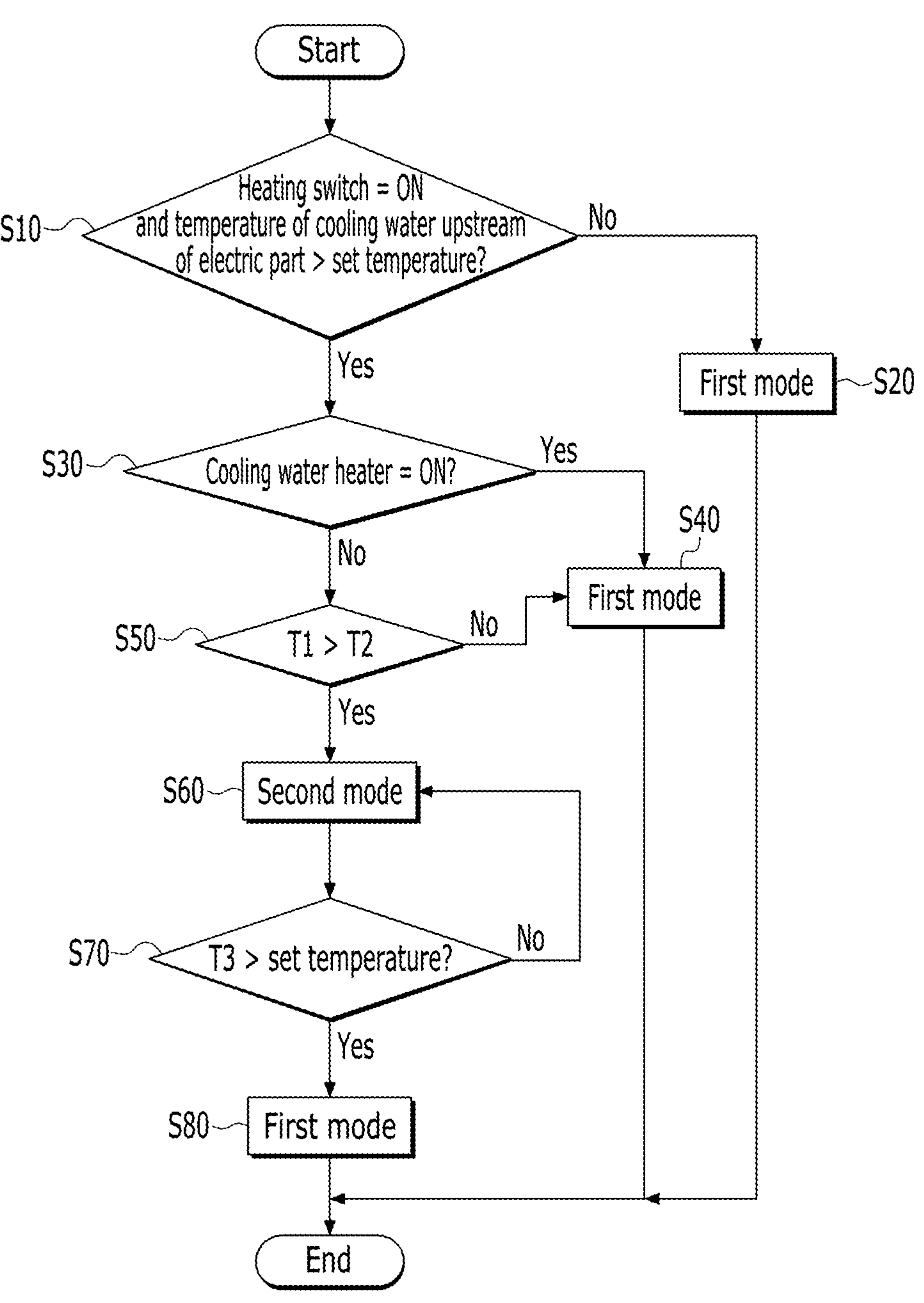
FIG. 3 is a flowchart for describing an operation of a heating system of an electric vehicle according to various exemplary embodiments of the present disclosure.

FIG. 3 is a flowchart for describing an operation of a heating system of an electric vehicle according to various exemplary embodiments of the present disclosure.

Referring to FIG. 3, the controller 80 judges whether the heating switch 70 is turned on by the driver, or the temperature of the cooling water which flows on the first branch line 30 upstream of the electric part 33 detected by the third temperature sensor 37 is a set temperature (e.g., 65° C.) or more (S10).

Figure 4:
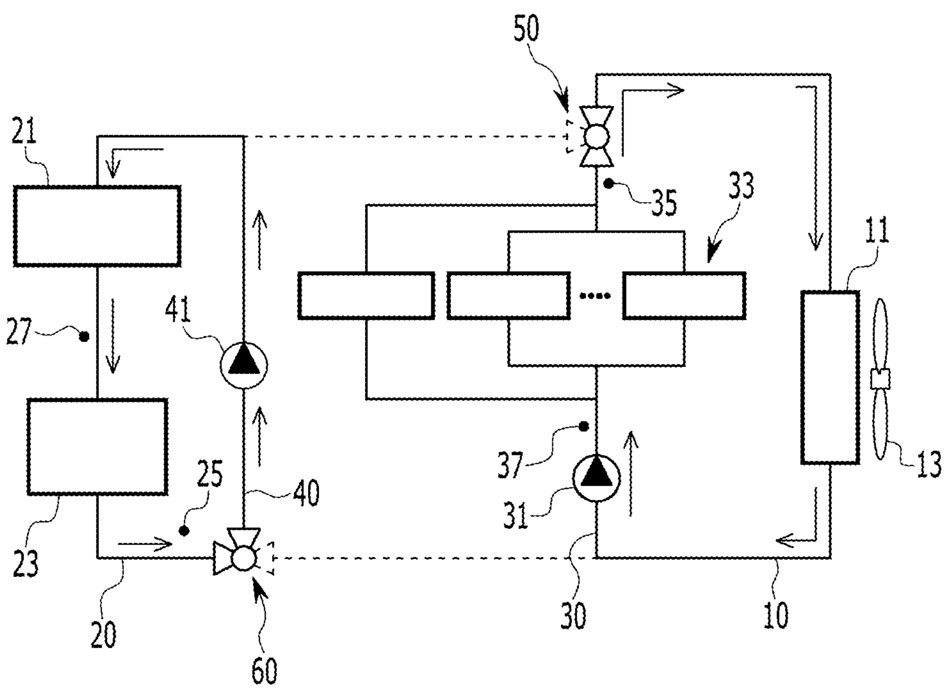
FIG. 4 and FIG. 5 are operation state diagrams for an operation of a heating system of an electric vehicle according to various exemplary embodiments of the present disclosure.

In step S10, when the heating switch 70 is turned off by the driver, or the temperature of the cooling water which flows on the first branch line 30 upstream of the electric part 33 detected by the third temperature sensor 37 is the set temperature (e.g., 65° C.) or less, the controller 80 controls the heating system to operate in the first mode (see FIG. 4) (S20).

To the present end, the controller 80 operates the first valve 50 and the second valve 60 so that the cooling line 10 and the first branch line 30 are fluidly connected and the heating line 20 and the second branch line 40 are fluidly connected.

Furthermore, the controller 80 drives the first electrically powered water pump 31, the second electrically powered water pump 41, and the cooling fan 13.

That is, when the heating switch 70 is turned off, it may be judged that an external air temperature is high, for example, during the summer season and when the temperate of the cooling water supplied to the electric part 33 is a predetermined temperature or lower than the predetermined temperature, it may be judged that the waste heat generated from the electric part 33 need not be used for the heating system. In the instant case, cooling water paths of the cooling line 10 and the heating line 20 are separated to cool the electric part 33 by use of the radiator 11 and the cooling fan 13 and heat a vehicle interior by use of the internal heater 23.

When the heating switch 70 is turned on by the driver, or the temperature of the cooling water which flows on the first branch line 30 upstream of the electric part 33 detected by the third temperature sensor 37 is the set temperature (e.g., 65° C.) or more, the controller 80 judges whether the cooling water heater 21 is in an ON state (S30).

The cooling water heater 21 is turned on or off according to the temperature of the cooling water which flows on the heating line 20, and operates when the temperature of the cooling water which flows on the heating line 20 is within a set temperature range. That is, the cooling water heater 21 may be implemented through an ON/OFF heater which operates within a set temperature range. For example, the cooling water heater 21 operates when the temperature of the cooling water which flows on the heating line 20 downstream of the cooling water heater 21 is 55° C. and stops when the temperature is 70° C. or more.

When the cooling water heater 21 is turned on, the controller 80 controls the heating system to operate in the first mode (S40).

To the present end, the controller 80 operates the first valve 50 so that the cooling line 10 and the first branch line 30 are fluidly connected and operates the second valve 60 so that the heating line 20 and the second branch line 40 are fluidly connected.

Furthermore, the controller 80 operates the first electrically powered water pump 31 and the second electrically powered water pump 41, and stops the operation of the cooling fan 13.

That is, in a situation in which the cooling water heater 21 operates, to prevent the electric part 33 from being additionally heated, the cooling water heated by the cooling water heater 21 separates the cooling water paths of the cooling line 10 and the heating line 20. Accordingly, the heating line 20 and the second branch line 40 are fluidly connected to heat the interior of the vehicle and the cooling line 10 and the first branch line 30 are fluidly connected to cool the electric part 33. However, in the instant case, the cooling fan 13 does not operate to prevent the temperature of the electric part 33 from being rapidly lowered.

In a situation in which the cooling water heater 21 is turned off, the controller 80 judges whether the temperature of the cooling water which flows on the first branch line 30 downstream of the electric part 33, T1 (e.g., the temperature of the cooling water detected by the first temperature sensor 35) is higher than the temperature of the cooling water which flows on the heating line 20 downstream of the internal heater 23, T2 (e.g., the temperature of the cooling water detected by the second temperature sensor 25) (S50).

Figure 5:
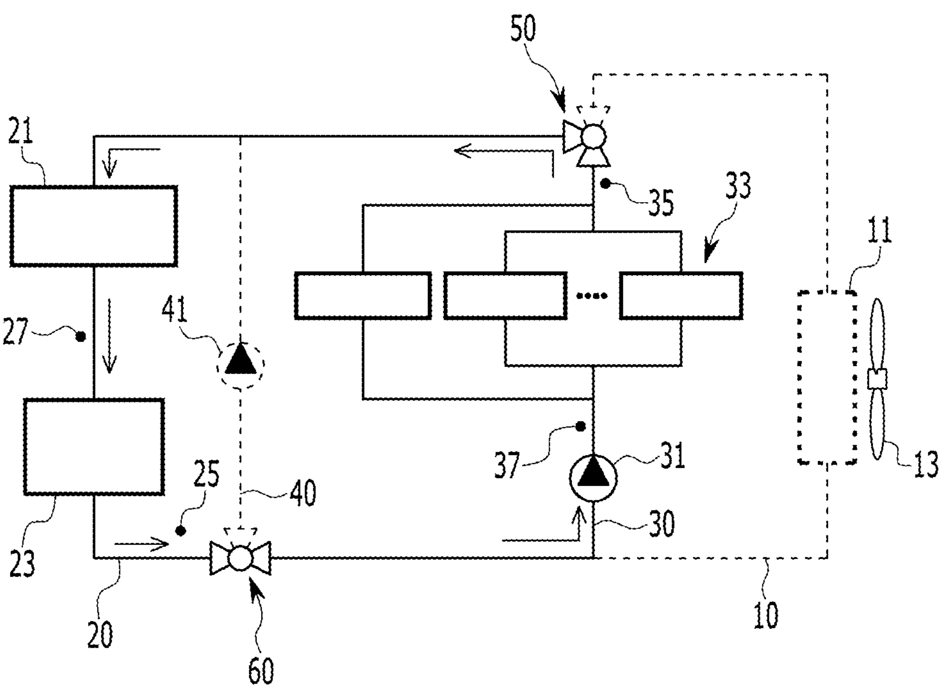

When the temperature of the cooling water which flows on the first branch line 30 downstream of the electric part 33 is higher than the temperature of the cooling water which flows on the heating line 20 downstream of the internal heater 23, the controller 80 controls the heating system to operate in the second mode (see FIG. 5) (S60).

To the present end, the controller 80 operates the first valve 50 and the second valve 60 so that the heating line 20 and the first branch line 30 are fluidly connected and the cooling line 10 and the second branch line 40 are opened.

Furthermore, the controller 80 operates the first electrically powered water pump 31, stops the operation of the second electrically powered water pump, and stops the operation of the cooling fan 13.

That is, when the temperature of the cooling water which flows on the first branch line 30 downstream of the electric part 33 is higher than the temperature of the cooling water which flows on the heating line 20 downstream of the internal heater 23, the heating line 20 and the first branch line 30 are connected so that the waste heat generated from the electric part 33 is used for internal heating of the vehicle, and in the instant case, the operation of the cooling fan 13 is stopped to prevent the cooling water which flows on the first branch line 30 from being rapidly cooled by the cooling fan 13.

While the heating system according to the exemplary embodiment of the present disclosure operates in the second mode, when a temperature T3 of the cooling water which flows on the first branch line 30 upstream of the electric part 33 is higher than the set temperature (e.g., 63° C.) (S70), the controller 80 controls the heating system to operate in the first mode (S80).

To the present end, the controller 80 operates the first valve 50 and the second valve 60 so that the cooling line 10 and the first branch line 30 are fluidly connected and the heating line 20 and the second branch line 40 are fluidly connected.

Furthermore, the controller 80 operates the first electrically powered water pump 31 and the second electrically powered water pump 41, and operates the cooling fan 13.

While the heating system according to an exemplary embodiment of the present disclosure operates in the second mode, excessive heat is generated from the electric part 33 due to various causes, it is necessary to rapidly decrease the temperature of the electric part 33. In such a case, the heating line 20 and the cooling line 10 are separated and the cooling fan 13 is operated to rapidly decrease the temperature of the electric part 33.

The heating system of the vehicle according to the exemplary embodiment of the present disclosure heats the interior of the vehicle by use of the waste heat generated from the electric part 33 to minimize the power consumption of the vehicle.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A heating system of a vehicle, the heating system comprising:

a cooling line in which a radiator mounted with a cooling fan is disposed;

a heating line including a cooling water heater heating cooling water and an internal heater for internal heating disposed therein, and fluidly connected to the cooling line;

a first branch line fluidly connecting a first portion of the cooling line and a first portion of the heating line, and including a first electrically powered water pump and an electric part disposed therein;

a second branch line fluidly connecting a second portion of the cooling line and a second portion of the heating line, and including a second electrically powered water pump disposed therein;

a first valve disposed in the cooling line, the heating line, and a branch point of the first branch line, in which the first portion of the heating line and the cooling line are connected; and a second valve disposed in the cooling line, the heating line, and a branch point of the second branch line in which the second portion of the cooling line and the heating line are connected, wherein a heating mode of the heating system operates, by operations of the first valve and the second valve, in a first mode in which the heating line and the second branch line form a closed circuit and the cooling line and the first branch line form the closed circuit, or in a second mode in which the heating line and the first branch line form the closed circuit, wherein the first mode or the second mode is switched based on a temperature of the cooling water which flows on the first branch line downstream of the electric part, a temperature of the cooling water which flows on the first branch line upstream of the first electrically powered water pump, and a temperature of the cooling water which flows on the heating line downstream of the internal heater, an ON/OFF state of a heating switch, and an operation state of the cooling water heater.

2. The heating system of claim 1, wherein when the heating switch is turned off or the temperature of the cooling water which flows on the first branch line downstream of the electric part is a predetermined temperature or lower than the predetermined temperature, the heating mode operates in the first mode.

3. The heating system of claim 2, wherein in the first mode, the first electrically powered water pump, the second electrically powered water pump, and the cooling fan operate.

4. The heating system of claim 1, wherein when the heating switch is turned on, the temperature of the cooling water which flows on the first branch line downstream of the electric part is a predetermined temperature or higher than the predetermined temperature, and the cooling water heater is in an ON state, the heating mode operates in the first mode.

5. The heating system of claim 4, wherein in the first mode, the first electrically powered water pump and the second electrically powered water pump operate, and the cooling fan stops.

6. The heating system of claim 4, wherein the cooling water heater operates within a set temperature range.

7. The heating system of claim 1, wherein when the heating switch is turned on, the temperature of the cooling water which flows on the first branch line downstream of the electric part is a predetermined temperature or higher than the predetermined temperature, the cooling water heater is in an OFF state, and the temperature of the cooling water which flows on the first branch line downstream of the electric part is higher than the temperature of the cooling water which flows on the heating line downstream of the internal heater, the heating mode operates in the second mode.

8. The heating system of claim 7, wherein in the second mode, the first electrically powered water pump, the second electrically powered water pump, and the cooling fan operate.

9. The heating system of claim 7, wherein the cooling water heater operates within a set temperature range.

10. The heating system of claim 7, wherein when the temperature of the cooling water which flows on the first branch line upstream of the first electrically powered water pump is a threshold temperature or higher than the threshold temperature, the heating mode operates in the first mode.

11. The heating system of claim 10, wherein in the first mode, the first electrically powered water pump, the second electrically powered water pump, and the cooling fan operate.

12. The heating system of claim 1, wherein the first valve and the second valve are three-way valves.

13. A heating system of a vehicle, the heating system comprising:

a cooling line in which a radiator mounted with a cooling fan is disposed;

a heating line including a cooling water heater heating cooling water and an internal heater for internal heating disposed therein, and fluidly connected to the cooling line;

a first branch line fluidly connecting a first portion of the cooling line and a first portion of the heating line, and including a first electrically powered water pump and an electric part disposed therein;

a second branch line fluidly connecting a second portion of the cooling line and a second portion of the heating line, and including a second electrically powered water pump disposed therein;

a first valve disposed in the cooling line, the heating line, and a branch point of the first branch line, in which the first portion of the heating line and the cooling line are connected;

a second valve disposed in the cooling line, the heating line, and a branch point of the second branch line in which the second portion of the cooling line and the heating line are connected; and a controller electrically connected to the first vale and the second valve, the first electrically powered water pump, the second electrically powered water pump, and the cooling fan, wherein the first valve and the second valve are three-way valves, wherein a heating mode of the heating system operates by the controller with operations of the first valve and the second valve, in a first mode in which the heating line and the second branch line form a closed circuit and the cooling line and the first branch line form the closed circuit, or in a second mode in which the heating line and the first branch line form the closed circuit, and wherein the first mode or the second mode is switched by the controller based on a temperature of the cooling water which flows on the first branch line downstream of the electric part, a temperature of the cooling water which flows on the first branch line upstream of the first electrically powered water pump, and a temperature of the cooling water which flows on the heating line downstream of the internal heater, an ON/OFF state of a heating switch, and an operation state of the cooling water heater.

14. The heating system of claim 13, wherein when the heating switch is turned off or the temperature of the cooling water which flows on the first branch line downstream of the electric part is a predetermined temperature or lower than the predetermined temperature, the heating mode operates in the first mode by the controller, and wherein in the first mode, the first electrically powered water pump, the second electrically powered water pump, and the cooling fan operate.

15. The heating system of claim 13, wherein when the heating switch is turned on, the temperature of the cooling water which flows on the first branch line downstream of the electric part is a predetermined temperature or higher than the predetermined temperature, and the cooling water heater is in an ON state, the heating mode operates in the first mode by the controller, and wherein in the first mode, the first electrically powered water pump and the second electrically powered water pump operate, and the cooling fan stops.

16. The heating system of claim 13, wherein when the heating switch is turned on, the temperature of the cooling water which flows on the first branch line downstream of the electric part is a predetermined temperature or higher than the predetermined temperature, the cooling water heater is in an OFF state, and the temperature of the cooling water which flows on the first branch line downstream of the electric part is higher than the temperature of the cooling water which flows on the heating line downstream of the internal heater, the heating mode operates in the second mode by the controller, wherein in the second mode, the first electrically powered water pump, the second electrically powered water pump, and the cooling fan operate.

17. The heating system of claim 16, wherein when the temperature of the cooling water which flows on the first branch line upstream of the first electrically powered water pump is a threshold temperature or higher than the threshold temperature, the heating mode operates in the first mode by the controller, and wherein in the first mode, the first electrically powered water pump, the second electrically powered water pump, and the cooling fan operate.

* * * * *